(12) United States Patent
Alligood

(10) Patent No.: US 6,327,441 B1
(45) Date of Patent: Dec. 4, 2001

(54) CAMERA WITH BATTERY HOLDER COVER FOR FILM COMPARTMENT

(75) Inventor: John H. Alligood, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/534,513

(22) Filed: Mar. 24, 2000

(51) Int. Cl.$^7$ .............................. G03B 17/02; G03B 17/00
(52) U.S. Cl. ........................... 396/539; 396/6; 396/442; 396/536; 396/538
(58) Field of Search ...................... 396/6, 318, 442, 396/536, 538, 539

(56) References Cited

U.S. PATENT DOCUMENTS

| | | | |
|---|---|---|---|
| 3,524,393 | 8/1970 | Greger et al. | 396/539 |
| 3,753,389 | 8/1973 | Monks | 396/539 |
| 3,754,453 | 8/1973 | Ernisse et al. | 396/539 |
| 3,943,537 | 3/1976 | Lange | 396/539 |
| 4,214,830 | 7/1980 | Schroder | 396/539 |
| 4,232,956 | * 11/1980 | Hashimoto et al. | 396/318 |
| 5,630,177 | * 5/1997 | Yamada et al. | 396/6 |
| 5,682,571 | 10/1997 | Balling | 396/538 |
| 5,752,087 | 5/1998 | Sangregory | 396/6 |
| 5,893,652 | * 4/1999 | Stanchus et al. | 396/318 |

FOREIGN PATENT DOCUMENTS 9-204017   8/1997   (JP) .

* cited by examiner

*Primary Examiner*—David M. Gray
*Assistant Examiner*—Rochelle Blackman
(74) *Attorney, Agent, or Firm*—Roger A. Fields

(57) ABSTRACT

A camera includes a film compartment, and a cover for closing the film compartment which is configured to hold a battery. The cover has a main portion for the battery and a fold-over portion that folds against the main portion to hold the battery between the main portion and the fold-over portion. Preferably, the film compartment is configured to receive a film cartridge having an end opening, and the fold-over portion has a support post that is arranged to fit into the end opening in the film cartridge when the fold-over portion is folded against the main portion.

13 Claims, 2 Drawing Sheets

CAMERA WITH BATTERY HOLDER COVER FOR FILM COMPARTMENT

FIELD OF THE INVENTION

The invention relates generally to the field of photography, and in particular to cameras. More specifically, the invention relates to a camera with a battery holder cover that closes a film compartment.

BACKGROUND OF THE INVENTION

It is known as disclosed in U.S. Pat. No. 3,754,453 issued Aug. 28, 1973 for a camera to have a cover that closes a film compartment for a film cartridge, and that is configured to hold a battery.

SUMMARY OF THE INVENTION

A camera comprising a film compartment, and a cover for closing the film compartment which is configured to hold a battery, is characterized in that:

the cover has a main portion for the battery and a fold-over portion that folds against the main portion to hold the battery between the main portion and the fold-over portion.

Preferably, the film compartment is configured to receive a film cartridge having an end opening, and the fold-over portion has a support post that is arranged to fit into the end opening in the film cartridge when the fold-over portion is folded against the main portion.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
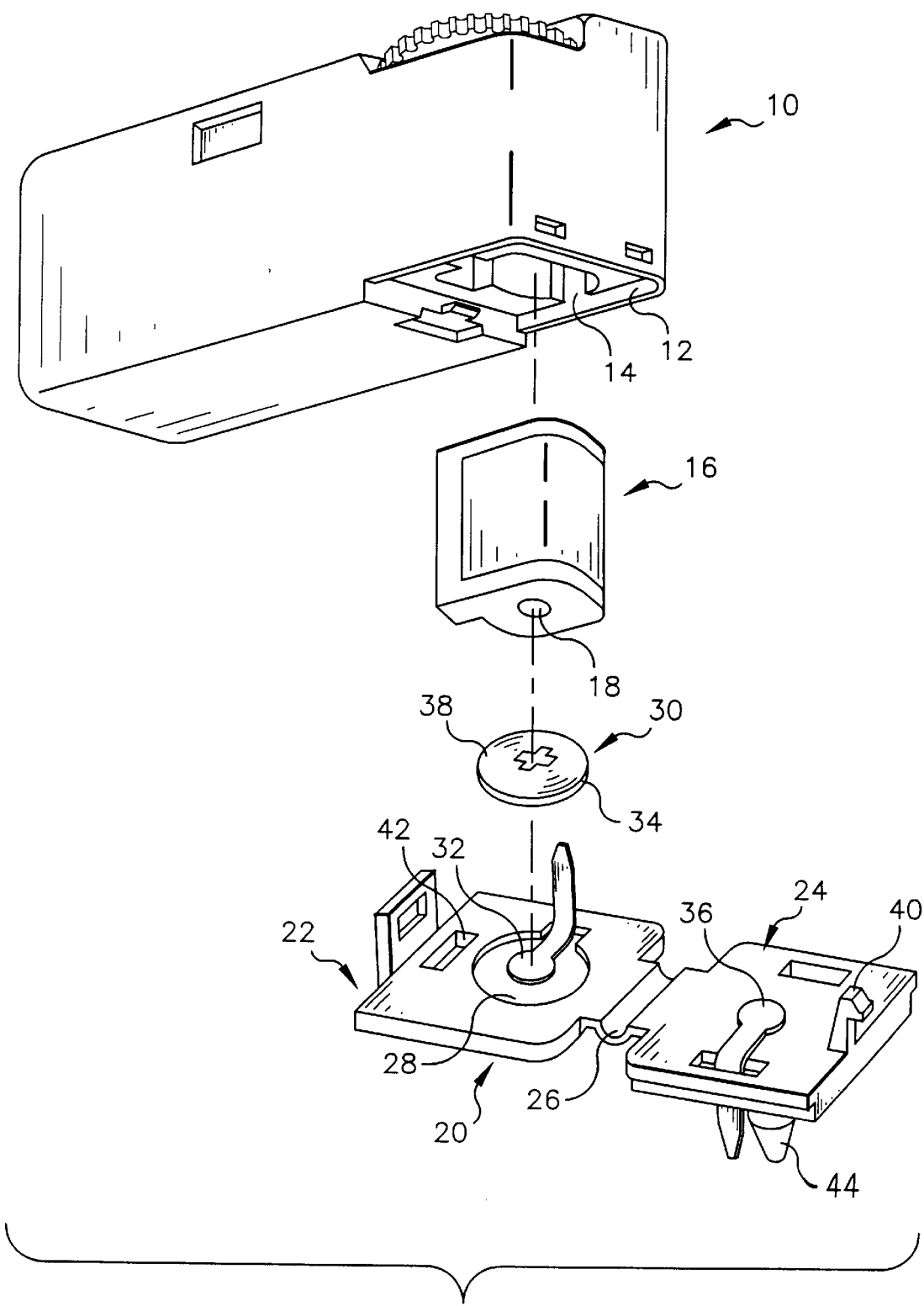
FIG. 1 is an exploded bottom perspective view of a camera with a battery holder cover for a film compartment in the camera, according to a preferred embodiment of the invention.

Referring now to the drawings, FIG. 1 shows a camera 10 having a bottom film load opening 12 to an interior film compartment 14. The film compartment 14 is configured to receive a conventional film cartridge 16 though the film load opening 12. The film cartridge 16 has a bottom end opening 18. See FIG. 2.

A cover 20 is adapted to be placed at least partially within the bottom film load opening 12 to light-tightly close (seal) the film compartment 14. The cover 20 has a main portion 22 and a fold-over portion 24 that are integrally connected via an elastic hinge 26. The hinge 26 permits the fold-over portion 24 to be folded against the main portion 22. See FIG. 2.

Figure 2:
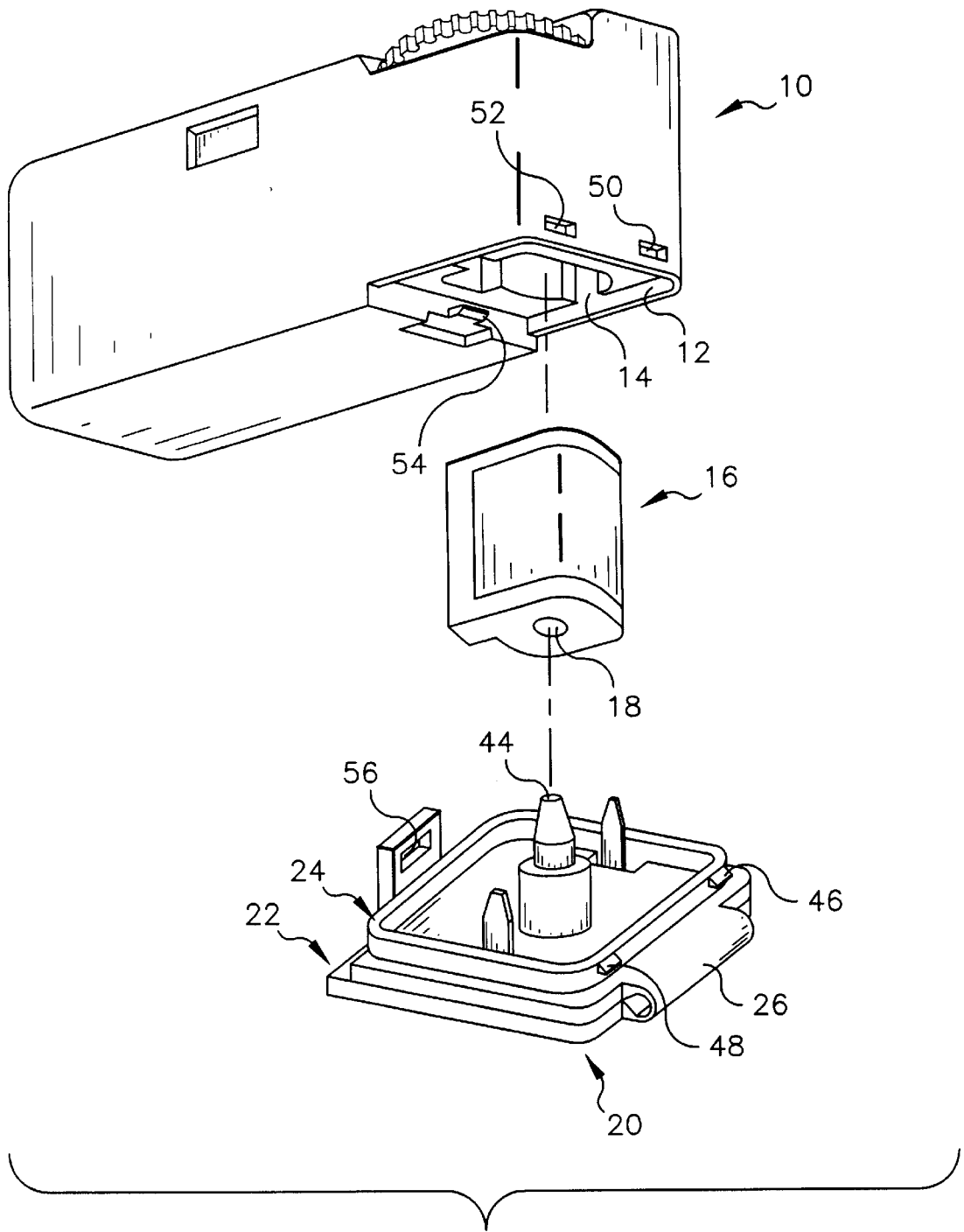
FIG. 2 is an exploded bottom perspective view of the camera, showing a fold-over portion of the cover folded against a main portion of the cover to hold a battery between them.

The main portion 22 has a circular-shaped cavity 28 for receiving a similar-shaped conventional battery 30. See FIG. 1. When the battery 30 is in the cavity 28 and the fold-over portion 24 is folded against the main portion 22 as shown in FIG. 2, the cavity is closed to capture (hold) the battery between the main and fold-over portions.

A negative electrical contact 32 in the cavity 28 makes conductive contact with a negative (bottom) side 34 of the battery 30 when the battery is in the cavity. A positive electrical contact 36 on the fold-over portion 24 makes conductive contact with a positive (top) side 38 of the battery 30 when the fold-over portion is folded against the main portion 22. The negative and positive electrical contacts 32 and 36 are connected via common electrical leads to an appropriate known circuit, such as an electronic flash circuit or a motorized film advance circuit, to be powered by the battery 30.

A resilient hook 40 on the fold-over portion 24 is received in a mating opening 42 in the main portion 22 to mutually engage the main and fold-over portions when the fold-over portion is folded against the main portion 22. The hook 40 and the mating opening 42 cooperate to maintain the main and fold-over portions 22 and 24 folded together as shown in FIG. 2. The hook 40 can be removed from the mating opening 42 to permit the fold-over portion 24 to be unfolded from the main portion 22. This allows replacement of the battery 30 in the cavity 28.

The fold-over portion 24 has a support post 44 that is arranged to fit into the bottom end opening 18 in the film cartridge 16 when the fold-over portion is folded against the main portion 22. See FIG. 2.

When the fold-over portion 24 is folded against the main portion 22, and the cover 20 is placed in the bottom film load opening 12 to light-tightly close the film compartment 14, the support post 44 projects from the film load opening into the film compartment to be received in the bottom end opening 18 in the film cartridge 16 in the film compartment. The cavity 28 with the battery 30 is positioned at the film compartment 14, proximate (beneath) the film cartridge 16. The fold-over portion 24 has a pair of identical tabs 46 and 48 that are received in respective holes 50 and 52 in the camera 10, and the camera has a tab 54 that is received in a hole 56 in the main portion 22, to secure the cover 20 to the camera.

A method of replacing the battery 30 in the camera includes the successive steps of:

removing the cover 20 from over the film compartment 14 to open the film compartment, by first separating the hole 56 from the tab 54 and by separating the tabs 46 and 48 from the holes 50 and 52;

unfolding the fold-over portion 24 from the main portion 22 to expose (reveal) the cavity 28 with the battery, by first separating the hook 40 from the mating opening 42;

replacing the battery in the cavity;

folding the fold-over portion against the main portion, and returning the hook to the mating opening; and placing the cover over the film compartment to close the film compartment, and returning the tabs 46 and 48 to the holes 50 and 52 and by returning the hole 56 to the tab 54.

The invention has been described with reference to a preferred embodiment. However, it will be appreciated that variations and modifications can be effected by a person of ordinary skill in the art without departing from the scope of the invention. For example, the cavity 28 instead of being in the main body portion 22, can alternatively be in the fold-over portion 22 or it can be in both portions.

PARTS LIST 10. camera
12. bottom film load opening
14. interior film compartment
16. film cartridge
18. bottom end opening
20. cover
22. main portion
24. fold-over portion
26. hinge
28. cavity
30. battery
32. negative electrical contact
34. negative (bottom) side
36. positive electrical contact
38. positive (top) side
40. hook
42. mating opening
44. support post
46. tab
48. tab
50. hole
52. hole
54. tab
56. hole

What is claimed is:

1. A camera comprising a film compartment, and a cover for closing said film compartment which is configured to hold a battery, is characterized in that:

said cover has a main portion for the battery and a fold-over portion that folds against said main portion to hold the battery between said main portion and said fold-over portion.

2. A camera as recited in claim 1, wherein said main portion and said fold-over portion are engageable with one another to maintain said fold-over portion folded against said main portion.

3. A camera as recited in claim 1, wherein said film compartment is configured to receive a film cartridge having an end opening, and said fold-over portion has a support post that is arranged to fit into the end opening in the film cartridge when said fold-over portion is folded against said main portion.

4. A camera as recited in claim 1, wherein at least one of said main portion and said fold-over portion has a cavity for receiving the battery which is closed when said fold-over portion is folded against said main portion.

5. A camera as recited in claim 4, wherein said film compartment has a film load opening, and said cover fits at least partially within said film load opening to position said cavity at said film compartment when said cover closes said film compartment.

6. A camera as recited in claim 5, wherein said film compartment is configured to receive a film cartridge having an end opening through said film load opening, and said cover has a support post that projects from said film load opening into said film compartment to fit within the end opening in the film cartridge when said cover closes said film compartment.

7. A camera as recited in claim 1, wherein a hinge connects said main portion and said fold-over portion to permit said fold-over portion to be folded against said main portion.

8. A method of loading a battery into a camera that includes a film compartment, and a cover for closing the film compartment which is configured to hold the battery, is characterized by the successive steps of:

placing the battery on one of a main portion and a fold-over portion of the cover;

folding the fold-over portion against the main portion to hold the battery between the main portion and the fold-over portion; and placing the cover over the film compartment to close the film compartment.

9. A method as recited in claim 8, further having the step of engaging the fold-over portion with the main portion to hold the battery between them when the fold-over portion is folded against the main portion.

10. A method as recited in claim 8, further having the step of inserting a support post that projects from the fold-over portion into an end opening in a film cartridge in the film compartment when the cover is placed over the film compartment to close the film compartment.

11. A method of replacing a battery in a camera that includes a film compartment, and a cover for closing the film compartment which is configured to hold the battery, is characterized by the successive steps of:

removing the cover from over the film compartment to open the film compartment;

unfolding a fold-over portion of the cover from a main portion of the cover to expose a cavity with the battery, in at least one of the fold-over portion and the main cover portion;

replacing the battery in the cavity;

folding the fold-over portion against the main portion; and placing the cover over the film compartment to close the film compartment.

12. A cover for closing a film compartment in a camera and which is configured to hold a battery, said cover comprising:

a main portion for the battery; and a fold-over portion that folds against said main portion to hold the battery between said main portion and said fold-over portion.

13. A cover as recited in claim 12, wherein said fold-over portion has a support post that is arranged to fit into an end opening in a film cartridge when said fold-over portion is folded against said main portion.

* * * * *